United States Patent
Furukawa

(10) Patent No.: US 12,522,180 B2
(45) Date of Patent: Jan. 13, 2026

(54) WIPER WASHER CONTROL APPARATUS

(71) Applicant: SUBARU CORPORATION, Tokyo (JP)

(72) Inventor: Toshiya Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 215 days.

(21) Appl. No.: 18/470,656

(22) Filed: Sep. 20, 2023

(65) Prior Publication Data
US 2024/0123945 A1 Apr. 18, 2024

(30) Foreign Application Priority Data

Oct. 13, 2022 (JP) ................................ 2022-164379

(51) Int. Cl.
*B60S 1/08* (2006.01)
*B60S 1/46* (2006.01)

(52) U.S. Cl.
CPC .............. *B60S 1/0896* (2013.01); *B60S 1/46* (2013.01)

(58) Field of Classification Search
CPC .................................. B60S 1/0896; B60S 1/46
USPC ........................................................... 701/49
See application file for complete search history.

(56) References Cited

U.S. PATENT DOCUMENTS

| 4,821,363 A * | 4/1989 | Delluc | B60S 1/3411 |
| | | | 15/250.07 |
| 2007/0029961 A1* | 2/2007 | Harita | B60S 1/481 |
| | | | 318/443 |
| 2007/0234499 A1* | 10/2007 | Thibodeau | B60S 1/46 |
| | | | 239/284.1 |
| 2017/0001602 A1* | 1/2017 | Oka | B60S 1/487 |
| 2017/0361811 A1* | 12/2017 | Carlesimo | B60S 1/583 |

FOREIGN PATENT DOCUMENTS

JP 2004155318 A * 6/2004

OTHER PUBLICATIONS

U.S. Dept. of Defense, Chapter 8 Automotive Electrical Circuits and Wiring, https://media.defense.gov/2014/Jun20/2002655900/-1/-1/1/140620-N-ZZ182-6548.pdf (Year: 2014).*

* cited by examiner

*Primary Examiner* — Navid Z. Mehdizadeh
*Assistant Examiner* — Brian K Palmarchuk
(74) *Attorney, Agent, or Firm* — Rimon P.C.

(57) ABSTRACT

A wiper washer control apparatus includes an ignition sensor, a shift position sensor, a wiper driving unit, a washer spraying unit, a wiper lever detection unit, and a wiper washer control unit. The wiper washer control unit changes a control to be performed by the wiper driving unit to a delay mode when receiving information indicating that the traveling driver is in the started state from the ignition sensor, receiving information indicating that a shift position is in a parking range from the shift position sensor, and receiving information indicating that the delay mode is to be started from the wiper lever detection unit. The wiper washer control unit changes the control to be performed by the wiper driving unit to a spray mode when receiving, in the delay mode, information indicating that the spray mode is to be started from the wiper lever detection unit.

12 Claims, 7 Drawing Sheets

WIPER WASHER CONTROL APPARATUS

CROSS-REFERENCE TO RELATED APPLICATIONS

The present application claims priority from Japanese Patent Application No. 2022-164379 filed on Oct. 13, 2022, the entire contents of which are hereby incorporated by reference.

BACKGROUND

The disclosure relates to a wiper washer control apparatus.

Recently, a front view from a front windshield is to be clear not only in terms of a front view for a driver who drives a vehicle but also in terms of stable operations of various sensors involved in controlling an operation of the vehicle. Such various sensors may include, for example, a visible light camera. For example, in winter, if the front windshield is frozen with frost or any other reason, the front windshield is to be defrosted to obtain a clear front view. It takes about five minutes to defrost the front windshield even if a defroster is used.

SUMMARY

An aspect of the disclosure provides a wiper washer control apparatus that includes an ignition sensor, a shift position sensor, a wiper driving unit, a washer spraying unit, a wiper lever detection unit, and a wiper washer control unit. The ignition sensor is configured to receive information regarding whether a traveling driver is in a started state or a stopped state. The shift position sensor is configured to receive information regarding a position selected by a gear shift lever. The wiper driving unit is configured to cause a wiper to operate. The wiper is configured to wipe a front windshield. The washer spraying unit is configured to cause a washing liquid to be sprayed to the front windshield. The wiper lever detection unit is configured to receive operation information related to a wiper lever. The wiper lever is configured to allow for an operation of the wiper and an operation of washer spraying. The wiper washer control unit is configured to control the wiper driving unit and the washer spraying unit based on the operation information related to the wiper lever and received by the wiper lever detection unit. The wiper washer control unit is configured to change a control to be performed by the wiper driving unit to a delay mode when the wiper washer control unit receives information indicating that the traveling driver is in the started state from the ignition sensor, receives information indicating that a shift position is in a parking range from the shift position sensor, and receives information indicating that the delay mode is to be started from the wiper lever detection unit. The delay mode is a mode in which a time from a start of the washer spraying to a start of a wiper operation is delayed as compared with the time in a normal mode. The wiper washer control unit is configured to change the control to be performed by the wiper driving unit to a spray mode when the wiper washer control unit receives, in the delay mode, information indicating that the spray mode is to be started from the wiper lever detection unit. The spray mode is a mode in which the washer spraying unit is caused to operate.

An aspect of the disclosure provides a wiper washer control apparatus that includes an ignition sensor, a shift position sensor, and circuitry. The ignition sensor is configured to receive information regarding whether a traveling driver is in a started state or a stopped state. The shift position sensor is configured to receive information regarding a position selected by a gear shift lever. The circuitry is configured to receive operation information related to a wiper lever. The wiper lever is configured to allow for an operation of a wiper and an operation of washer spraying. The circuitry is configured to control wiper driving and washer spraying based on the operation information related to the wiper lever. The wiper driving causes the wiper to operate. The wiper is configured to wipe a front windshield. The washer spraying causes a washing liquid to be sprayed to the front windshield. The circuitry is configured to change a control to be performed by the wiper driving to a delay mode when receiving information indicating that the traveling driver is in the started state from the ignition sensor, receiving information indicating that a shift position is in a parking range from the shift position sensor, and receiving information indicating that the delay mode is to be started. The delay mode is a mode in which a time from a start of the washer spraying to a start of a wiper operation is delayed as compared with the time in a normal mode. The circuitry is configured to change the control to be performed by the wiper driving to a spray mode when receiving, in the delay mode, information indicating that the spray mode is to be started. The spray mode is a mode in which the washer spraying is caused to operate.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
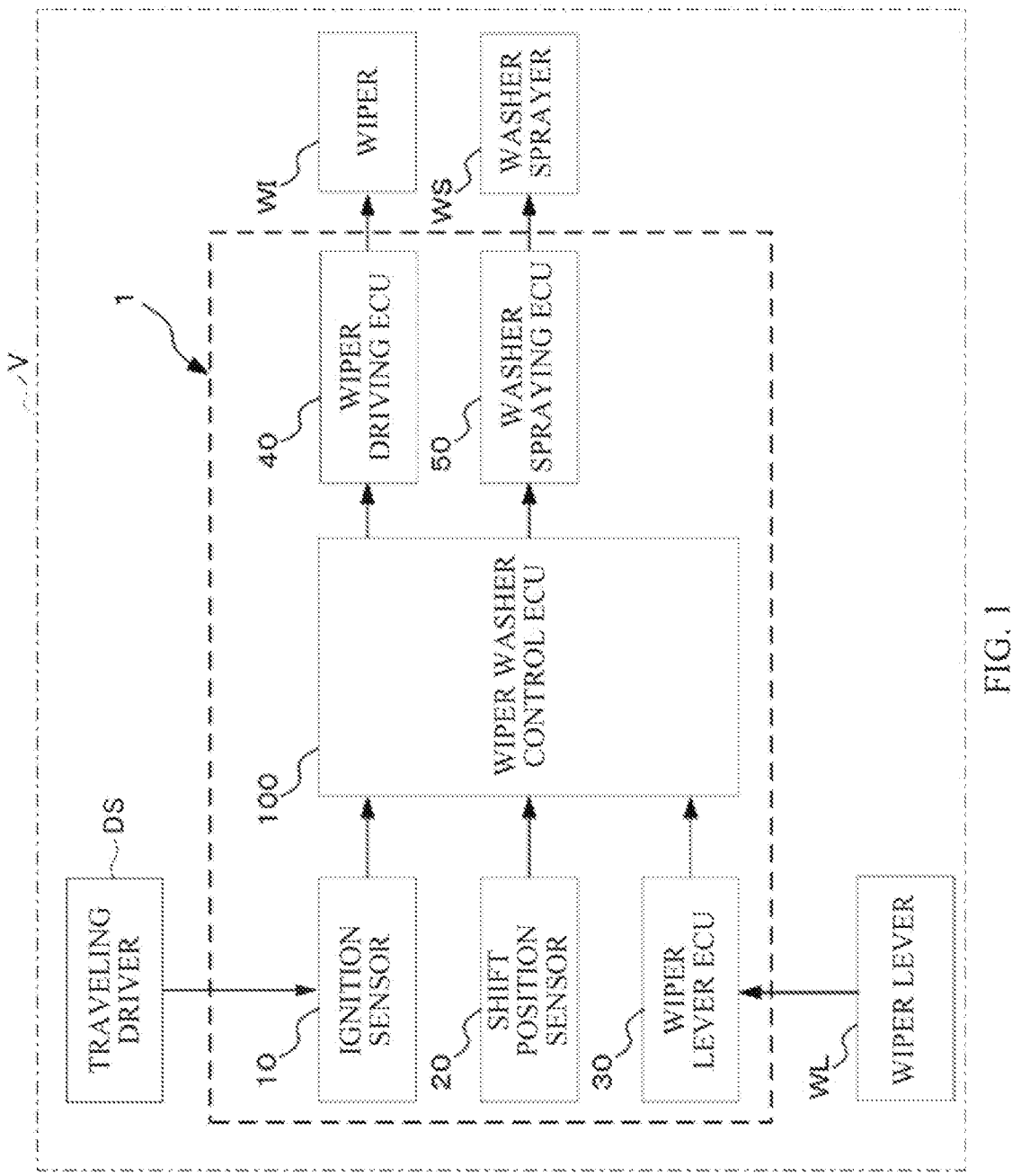
FIG. 1 is a diagram illustrating a configuration of a wiper washer control apparatus according to one example embodiment of the disclosure.

When a front windshield is frozen with frost or the like, the frost or the like is sometimes wiped by spraying a washing liquid and then causing a wiper to operate. In this case, if an outside air temperature is very low, a temperature of a surface of a window glass can be below a freezing temperature of the washing liquid. The washing liquid can thus freeze over the front windshield, making the view even worse.

In addition, if the wiper is operated in a state where the wiper is stuck to the front windshield due to the frozen state of the front windshield, the wiper can deteriorate or break.

To address the above, a control is to be performed to allow for short-time defrosting of the front windshield by switching an operation of the wiper and an operation of spraying the washing liquid (washer spraying) in accordance with the frozen state of the front windshield.

To achieve such a control, for example, Japanese Unexamined Patent Application Publication (JP-A) No. 2004-155318 discloses a technique including an ignition switch, a washing liquid injection switch, and a controller. The washing liquid injection switch is configured to turn on and off washing liquid injection performed by a washing liquid injector. The controller is coupled to the washing liquid injector, a wiper driver, the ignition switch, and the washing liquid injection switch. In this technique, the controller performs switching between an associated mode and an unassociated mode based on whether a condition is satisfied that the ignition switch is brought into an on state from an off state while the washing liquid injection switch is kept in an on state. Such a condition is to be caused by respective operations of the ignition switch and the washing liquid injection switch. The associated mode is a mode in which the washing liquid injector and the wiper operate in association with each other. The unassociated mode is a mode in which the washing liquid injector and the wiper do not operate in association with each other.

In a technique disclosed in JP-A No. 2004-155318, however, the ignition switch is to be brought into the on state from the off state to perform the switching between the associated mode and the unassociated mode. This can take time for a driver who drives a vehicle to perform an operation of switching between the associated mode and the unassociated mode.

It is desirable to provide a wiper washer control apparatus that makes it possible to simplify an operation to be performed by a driver who drives a vehicle and to defrost a front windshield in a short time.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Some example embodiments of the disclosure will be described below with reference to FIGS. 1 to 7.

A vehicle V in the example embodiments of the disclosure may be, for example but not limited to, an automobile including an internal combustion engine or a motor as a traveling driver DS. In one example, the vehicle V may be a hybrid automobile including multiple traveling drivers DS including both the internal combustion engine and the motor.

First Example Embodiment

A description is provided of a wiper washer control apparatus 1 according to an example embodiment with reference to FIGS. 1 to 4.

[Configuration of Wiper Washer Control Apparatus 1]

As illustrated in FIG. 1, the wiper washer control apparatus 1 according to the example embodiment may include an ignition sensor 10, a shift position sensor 20, a wiper lever electronic control unit (ECU) 30, a wiper driving ECU 40, a washer spraying ECU 50, and a wiper washer control ECU 100.

The ignition sensor 10 may transmit information regarding whether the traveling driver DS is in a started state or a stopped state. The ignition sensor 10 may be, for example but not limited to, an ignition switch. When the ignition switch is in an on state, the ignition sensor 10 may transmit information indicating that the traveling driver DS is in the started state. When the ignition switch is in an off state, the ignition sensor 10 may transmit information indicating that the traveling driver DS is in the stopped state. The ignition sensor 10 may transmit information detected by the ignition sensor 10 to the wiper washer control ECU 100.

Note that the "started state" may include not only a state in which the traveling driver DS is causing the vehicle V to actually travel but also a state in which the vehicle V is travelable.

The shift position sensor 20 may detect a position selected by a gear shift lever, and transmit information regarding the detected position. For example, the shift position sensor 20 may detect shift position information by a sensor such as a gear position sensor GS, and transmit, to the wiper washer control ECU 100, information regarding whether the shift position is a parking position.

The wiper lever ECU 30 may receive operation information related to a wiper lever WL. The wiper lever WL may be configured to allow for an operation of a wiper WI and an operation of a washer sprayer WS. The wiper lever WL may be so provided that the driver who drives the vehicle V is able to perform the operation of the wiper WI and the operation of washer spraying by one hand. For example, the wiper lever WL may be provided on a vehicle front side of a steering wheel. Non-limiting examples of the operation information related to the wiper lever WL may include "wiper switch ON", "delay mode ON", "wiper intermittent operation ON", and "pull wiper lever WL". "Starting of a spray mode" and "canceling of the spray mode" may be operations substantially identical to each other. Non-limiting examples of such operations may include "pulling the wiper lever WL twice".

The wiper lever ECU 30 may transmit the operation information related to the wiper lever WL to the wiper washer control ECU 100.

The wiper driving ECU 40 may cause the wiper WI to operate. The wiper WI may be configured to wipe a front windshield. For example, the wiper driving ECU 40 may cause the wiper WI to operate or stop based on information transmitted from the wiper washer control ECU 100.

The washer spraying ECU 50 may cause the washer sprayer WS to spray a washing liquid to the front windshield. For example, the washer spraying ECU 50 may cause the washer sprayer WS to operate or stop based on information transmitted from the wiper washer control ECU 100.

The wiper washer control ECU 100 may control the wiper driving ECU 40 and the washer spraying ECU 50 based on the operation information related to the wiper lever WL transmitted from the wiper lever ECU 30. Details will be described below.

[Configuration of Wiper Washer Control ECU 100]

Figure 2:
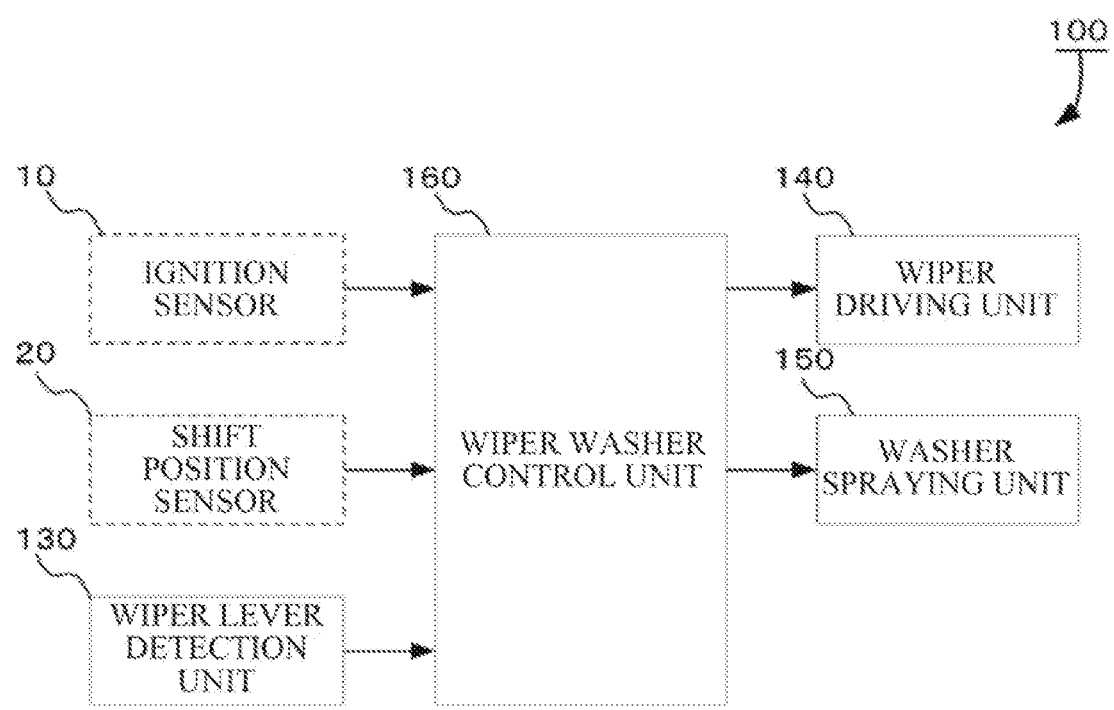
FIG. 2 is a diagram illustrating a configuration of a wiper washer control ECU of the wiper washer control apparatus according to one example embodiment of the disclosure.

As illustrated in FIG. 2, the wiper washer control ECU 100 may include a wiper lever detection unit 130, a wiper driving unit 140, a washer spraying unit 150, and a wiper washer control unit 160.

Coupled to the wiper washer control ECU 100 may be the ignition sensor 10, the shift position sensor 20, the wiper lever ECU 30, the wiper driving ECU 40, and the washer spraying ECU 50.

The ignition sensor 10 and the shift position sensor 20 may be directly coupled to the wiper washer control unit 160.

The wiper lever ECU 30, the wiper driving ECU 40, and the washer spraying ECU 50 may each perform transmission and reception of information with the wiper washer control unit 160, for example, via a control area network (CAN) or any other network.

The wiper lever detection unit 130 may receive, from the wiper lever ECU 30, the operation information related to the wiper lever WL configured to allow for the operation of the wiper WI and the operation of the washer spraying. The wiper lever detection unit 130 may transmit, to the wiper washer control unit 160, for example, operation information such as "wiper switch ON", "delay mode ON", "wiper intermittent operation ON", or "pull wiper lever WL" as the operation information related to the wiper lever WL.

The wiper driving unit 140 may cause the wiper WI to operate. The wiper WI may be configured to wipe the front windshield. The wiper driving unit 140 may receive control information from the wiper washer control unit 160. The wiper driving unit 140 may transmit the received control information to the wiper driving ECU 40 to cause the wiper WI to operate or stop.

The washer spraying unit 150 may cause the washing solution to be sprayed to the front windshield. The washer spraying unit 150 may receive control information from the wiper washer control unit 160. The washer spraying unit 150 may transmit the received control information to the washer spraying ECU 50 to cause the washer sprayer WS to operate or stop.

The wiper washer control unit 160 may determine whether the traveling driver DS is in the started state based on information from the ignition sensor 10. The wiper washer control unit 160 may also determine whether the shift position is the parking position based on information from the shift position sensor 20. In addition, the wiper washer control unit 160 may determine the operation on the wiper lever WL based on the operation information related to the wiper lever WL from the wiper lever detection unit 130.

Through a determination based on the information from the ignition sensor 10, the information from the shift position sensor 20, and the operation information related to the wiper lever WL from the wiper lever detection unit 130, the wiper washer control unit 160 may control each of the wiper driving unit 140 and the washer spraying unit 150.

For example, the wiper washer control unit 160 may change the control to be performed by the wiper driving unit 140 based on the information from the ignition sensor 10 regarding whether the traveling driver DS is in the started state, the information from the shift position sensor 20 regarding whether the shift position is the parking position, and the operation information related to the wiper lever WL from the wiper lever detection unit 130.

Figure 3A:
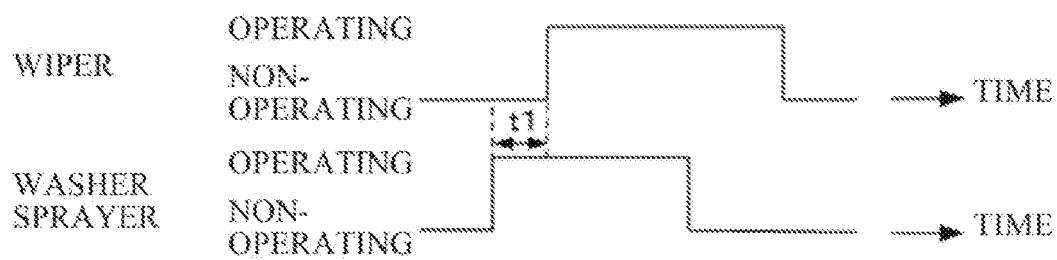
FIG. 3A is a diagram illustrating a normal mode as an operation mode of a wiper driving unit of the wiper washer control apparatus according to one example embodiment of the disclosure, where a vertical axis indicates an operating state and a non-operating state of each of a wiper and a washer sprayer, and a horizontal axis indicates an elapsed time from a start of washer spraying.
Figure 3B:
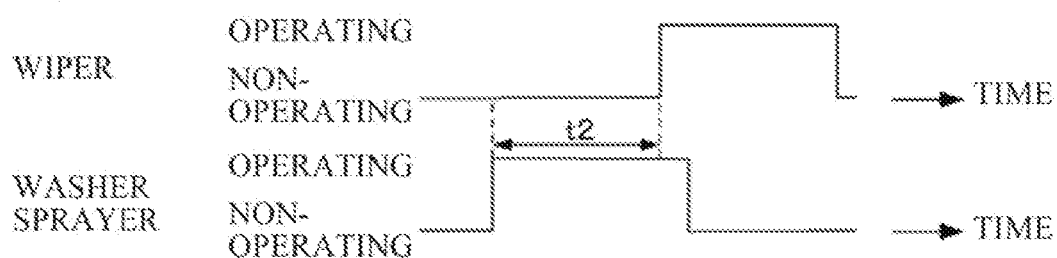
FIG. 3B is a diagram illustrating a delay mode as the operation mode of the wiper driving unit of the wiper washer control apparatus according to one example embodiment of the disclosure, where a vertical axis indicates the operating state and the non-operating state of each of the wiper and the washer sprayer, and a horizontal axis indicates the elapsed time from the start of the washer spraying.
Figure 3C:
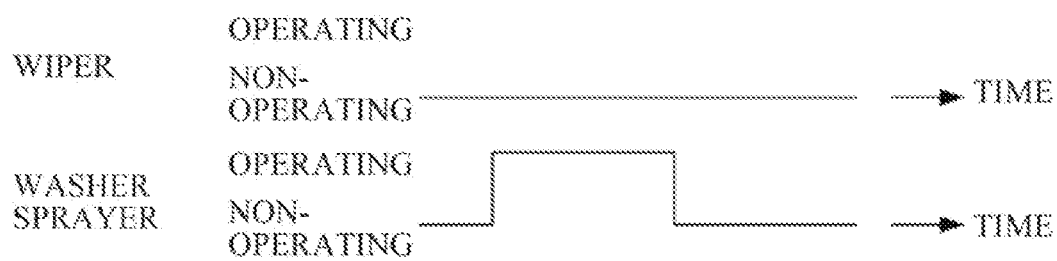
FIG. 3C is a diagram illustrating a spray mode as the operation mode of the wiper driving unit of the wiper washer control apparatus according to one example embodiment of the disclosure, where a vertical axis indicates the operating state and the non-operating state of each of the wiper and the washer sprayer, and a horizontal axis indicates the elapsed time from the start of the washer spraying.

As illustrated in FIGS. 3A to 3C, non-limiting examples of the control to be performed by the wiper driving unit 140 allowed by the wiper washer control unit 160 may include a normal mode NM, a delay mode DM, and a spray mode MM as operation modes.

As illustrated in FIG. 3A, for example, the normal mode NM may allow for a control in which the wiper washer control unit 160 causes the washer sprayer WS to operate, and after a time t1 elapses, causes the wiper WI to automatically operate.

As illustrated in FIG. 3B, for example, the delay mode DM may allow for the following control. The delay mode DM being selected by means of the wiper lever WL may cause the wiper washer control unit 160 to change the operation mode to the delay mode DM. In addition, the wiper lever WL being pulled once may cause the washer sprayer WS to operate, and after a time t2 elapses, cause the wiper WI to automatically operate. In this example, the time t2 may be longer than the time t1. For example, the time t2 may be three times as long as the time t1.

As illustrated in FIG. 3C, for example, the spray mode MM may allow for the following control. The wiper lever WL being pulled twice may cause the wiper washer control unit 160 to change the operation mode to the spray mode MM. In addition, the wiper lever WL being further pulled once may cause the washer sprayer WS to operate and may not cause the wiper WI to operate.

Note that for example, while the wiper lever WL is being pulled, the wiper washer control unit 160 may cause the washer sprayer WS to continuously operate.

When the wiper washer control unit 160 receives, from the ignition sensor 10, information indicating that the traveling driver DS is in the started state; receives, from the shift position sensor 20, information indicating that the shift position is in the parking range; and receives, from the wiper lever detection unit 130, information indicating that the delay mode DM is to be started, the wiper washer control unit 160 may change the control to be performed by the wiper driving unit 140 to the delay mode DM. The delay mode DM may be a mode in which a time from a start of the washer spraying to a start of a wiper operation is delayed as compared with that in the normal mode NM.

Here, non-limiting examples of the information indicating that switching is to be performed from the normal mode NM to the delay mode DM may include an operation of pulling down the wiper lever WL toward the lower side of the vehicle V to a position of "start the delay mode DM".

When the wiper washer control unit 160 receives, from the wiper lever detection unit 130, information indicating that the spray mode MM is to be started, while changing the control to be performed by the wiper driving unit 140 to the delay mode DM, the wiper washer control unit 160 may change the control to be performed by the wiper driving unit 140 to the spray mode MM.

Here, non-limiting examples of the information indicating that the spray mode MM is to be started may include an operation of continuously pulling the wiper lever WL twice.

When the wiper washer control unit 160 receives engine stop information from the ignition sensor 10 while changing the control to be performed by the wiper driving unit 140 to the delay mode DM, or when the wiper washer control unit 160 receives, from the shift position sensor 20, information indicating that the shift position is in a range other than the parking range, while changing the control to be performed by the wiper driving unit 140 to the delay mode DM, the wiper washer control unit 160 may change the control to be performed by the wiper driving unit 140 to the normal mode NM.

When the wiper washer control unit 160 receives, from the wiper lever detection unit 130, information indicating that the spray mode MM is to be canceled, while changing the control to be performed by the wiper driving unit 140 to the delay mode DM, the wiper washer control unit 160 may change the control to be performed by the wiper driving unit 140 to the normal mode NM.

Here, non-limiting examples of the information indicating that the spray mode MM is to be canceled may include an operation of continuously pulling the wiper lever WL twice while the control to be performed by the wiper driving unit 140 is being changed to the spray mode MM. This operation may be substantially the same as the operation of changing the control to be performed by the wiper driving unit 140 from the delay mode DM to the spray mode MM.

[Process to be Performed by Wiper Washer Control Apparatus 1]

Figure 4:
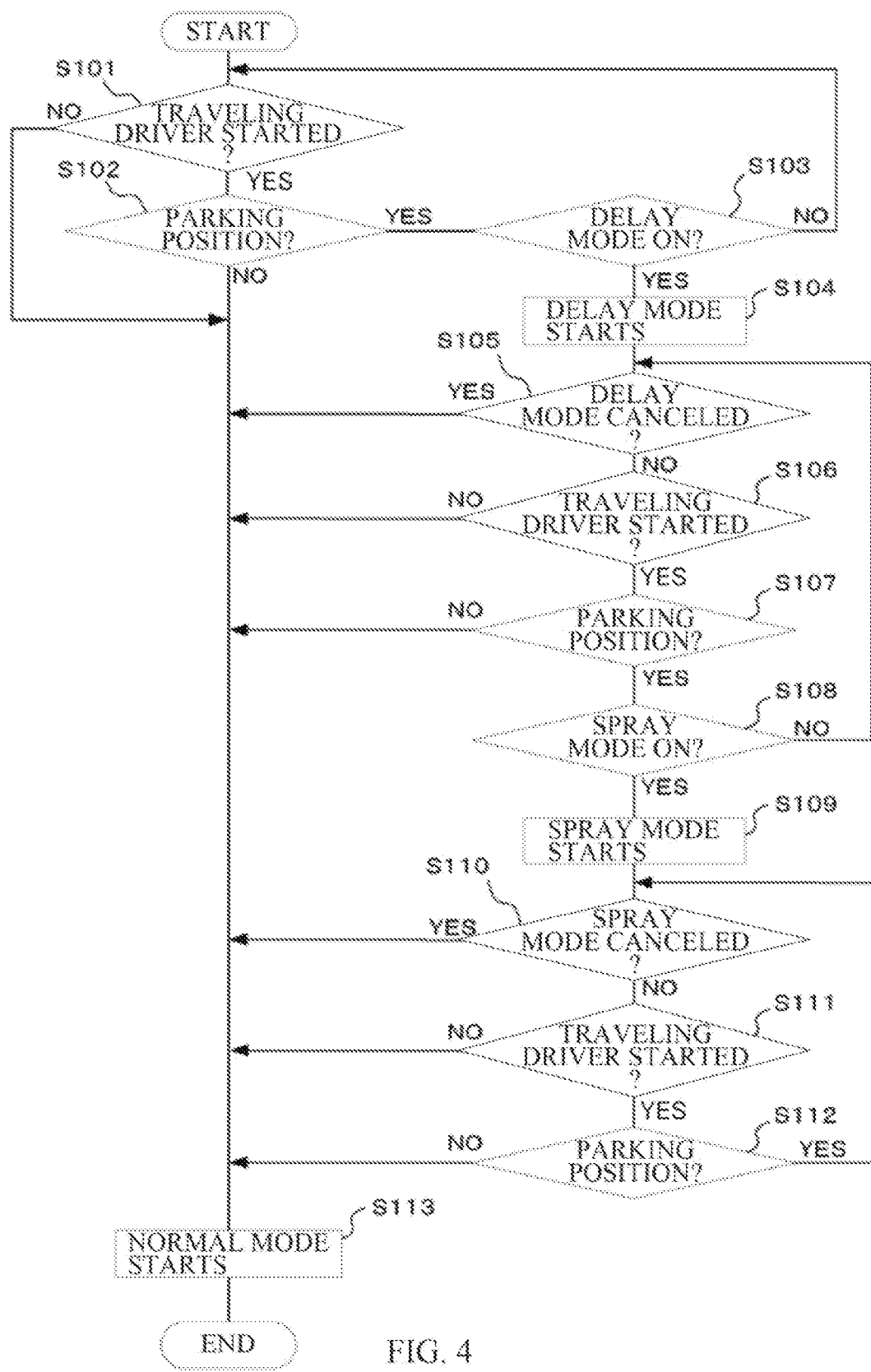
FIG. 4 is a flowchart of a process to be executed by the wiper washer control ECU of the wiper washer control apparatus according to one example embodiment of the disclosure.

Referring to FIG. 4, a process to be performed by the wiper washer control apparatus 1 according to the example embodiment will be described.

The wiper washer control unit 160 may determine whether the traveling driver DS is in the started state, based on the information from the ignition sensor 10 (step S101).

If the wiper washer control unit 160 determines that the traveling driver DS is not in the started state (step S101: NO), the wiper washer control unit 160 may change the operation mode to the normal mode NM (step S113).

If the wiper washer control unit 160 determines that the traveling driver DS is in the started state (step S101: YES), the wiper washer control unit 160 may determine whether the shift position is the parking position, based on the information from the shift position sensor 20 (step S102).

If the wiper washer control unit 160 determines that the shift position is not the parking position (step S102: NO), the wiper washer control unit 160 may change the operation mode to the normal mode NM (step S113).

If the wiper washer control unit 160 determines that the shift position is the parking position (step S102: YES), the wiper washer control unit 160 may determine whether the operation information related to the wiper lever WL is "delay mode ON", based on the information from the wiper lever detection unit 130 (step S103).

If the wiper washer control unit 160 determines that the operation information related to the wiper lever WL is not "delay mode ON" (step S103: NO), the wiper washer control unit 160 may return the process to step S101.

If the wiper washer control unit 160 determines that the operation information related to the wiper lever WL is "delay mode ON" (step S103: YES), the wiper washer control unit 160 may change the operation mode to the delay mode DM (step S104).

When the delay mode DM is started, the wiper washer control unit 160 may determine whether the delay mode DM has been canceled, based on the information from the wiper lever detection unit 130 (step S105).

If the wiper washer control unit 160 determines that the operation information related to the wiper lever WL indicates that the delay mode DM has been canceled (step S105: YES), the wiper washer control unit 160 may change the operation mode to the normal mode NM (step S113).

If the wiper washer control unit 160 determines that the operation information related to the wiper lever WL indicates that the delay mode DM has not been canceled yet (step S105: NO), the wiper washer control unit 160 may determine whether the traveling driver DS is in the started state, based on the information from the ignition sensor 10 (step S106).

If the wiper washer control unit 160 determines that the traveling driver DS is not in the started state (step S106: NO), the wiper washer control unit 160 may change the operation mode to the normal mode NM (step S113).

If the wiper washer control unit 160 determines that the traveling driver DS is in the started state (step S106: YES), the wiper washer control unit 160 may determine whether the shift position is the parking position, based on the information from the shift position sensor 20 (step S107).

If the wiper washer control unit 160 determines that the shift position is not the parking position (step S107: NO), the wiper washer control unit 160 may change the operation mode to the normal mode NM (step S113).

If the wiper washer control unit 160 determines that the shift position is the parking position (step S107: YES), the wiper washer control unit 160 may determine whether the operation information related to the wiper lever WL is "spray mode ON", based on the information from the wiper lever detection unit 130 (step S108).

If the wiper washer control unit 160 determines that the operation information related to the wiper lever WL is not "spray mode ON" (step S108: NO), the wiper washer control unit 160 may return the process to step S105.

If the wiper washer control unit 160 determines that the operation information related to the wiper lever WL is "spray mode ON" (step S108: YES), the wiper washer control unit 160 may change the operation mode to the spray mode MM (step S109).

When the spray mode MM is started, the wiper washer control unit 160 may determine whether the spray mode MM has been canceled, based on the information from the wiper lever detection unit 130 (step S110).

If the wiper washer control unit 160 determines that the operation information related to the wiper lever WL is "spray mode MM is to be canceled" (step S110: YES), the wiper washer control unit 160 may change the operation mode to the normal mode NM (step S113).

If the wiper washer control unit 160 determines that the operation information related to the wiper lever WL is "spray mode MM is not to be canceled" (step S110: NO), the wiper washer control unit 160 may determine whether the traveling driver DS is in the started state, based on the information from the ignition sensor 10 (step S111).

If the wiper washer control unit 160 determines that "the traveling driver DS is in the stopped state" (step S111: NO), the wiper washer control unit 160 may change the operation mode to the normal mode NM (step S113).

If the wiper washer control unit 160 determines that "the traveling driver DS is in the started state" (step S111: YES), the wiper washer control unit 160 may determine whether the shift position is the parking position, based on the information from the shift position sensor 20 (step S112).

If the wiper washer control unit 160 determines that "the shift position is not the parking position" (step S112: NO), the wiper washer control unit 160 may change the operation mode to the normal mode NM (step S113).

If the wiper washer control unit 160 determines that the operation information related to the wiper lever WL is "the shift position is the parking position" (step S112: YES), the wiper washer control unit 160 may cause the process to proceed to step S110.

[Action and Effects]

As described above, the wiper washer control apparatus 1 according to the example embodiment includes the ignition sensor 10, the shift position sensor 20, the wiper driving unit 140, the washer spraying unit 150, the wiper lever detection unit 130, and the wiper washer control unit 160. The ignition sensor 10 receives information regarding whether the traveling driver DS is in the started state or the stopped state. The shift position sensor 20 receives the information regarding the position selected by the gear shift lever. The wiper driving unit 140 causes the wiper WI to operate. The wiper WI wipes the front windshield. The washer spraying unit 150 causes the washing liquid to be sprayed to the front windshield. The wiper lever detection unit 130 receives the operation information related to the wiper lever WL. The wiper lever WL allows for the operation of the wiper WI and the operation of the washer sprayer WS. The wiper washer control unit 160 controls the wiper driving unit 140 and the washer spraying unit 150 based on the operation information related to the wiper lever WL and received by the wiper lever detection unit 130. The wiper washer control unit 160 changes the control to be performed by the wiper driving unit 140 to the delay mode when the wiper washer control unit 160 receives the information indicating that the traveling driver DS is in the started state from the ignition sensor 10, receives the information indicating that the shift position is in the parking range from the shift position sensor 20, and receives the information indicating that the delay mode DM is to be started from the wiper lever detection unit 130. The delay mode DM is a mode in which the time from the start of the washer spraying to the start of the wiper operation is delayed as compared with the time in the normal mode NM. The wiper washer control unit 160 changes the control to be performed by the wiper driving unit 140 to the spray mode MM when the wiper washer control unit 160 receives, in the delay mode DM, the information indicating that the spray mode MM is to be started from the wiper lever detection unit 130. The spray mode MM is a mode in which the washer spraying unit 150 is caused to operate.

That is, it is possible for the wiper washer control unit 160 to swiftly switch the operation mode of the wiper driving unit 140 to the normal mode NM, the delay mode DM, or the spray mode MM in response to the driver performing the operation of the wiper lever WL.

Accordingly, it is possible to make the operation to be performed by the driver easier, and to defrost the front windshield in a short time.

In addition, in the wiper washer control apparatus 1 according to the example embodiment, the wiper washer control unit 160 may change the control to be performed by the wiper driving unit 140 to the normal mode NM when the wiper washer control unit 160 receives, in the delay mode DM, the stop information related to the traveling driver DS from the ignition sensor 10 or when the wiper washer control unit 160 receives, in the delay mode DM, the information indicating that the shift position is in a range other than the parking range from the shift position sensor 20.

That is, when the driver who drives the vehicle V stops the traveling driver DS or when the driver changes the shift position to a range other than the parking range to cause the vehicle V to travel, it is possible for the wiper washer control unit 160 to determine that the driver has finished defrosting the front windshield and automatically change the control to be performed by the wiper driving unit 140 to the normal mode NM.

Accordingly, it is possible to make the operation to be performed by the driver easier, and to defrost the front windshield in a short time.

In addition, in the wiper washer control apparatus 1 according to the example embodiment, the wiper washer control unit 160 may change the control to be performed by the wiper driving unit 140 to the normal mode NM when the wiper washer control unit 160 receives, in the delay mode DM, the cancel information related to the spray mode MM from the wiper lever detection unit 130.

That is, it is possible for the driver to cancel the spray mode MM and cause the control to be performed by the wiper driving unit 140 to be changed to the normal mode NM by performing, with use of the wiper lever WL, an operation substantially the same as the operation for changing the control to be performed by the wiper driving unit 140 to the spray mode MM.

Accordingly, it is possible to make the operation to be performed by the driver easier, and to defrost the front windshield in a short time.

Second Example Embodiment

Figure 5:
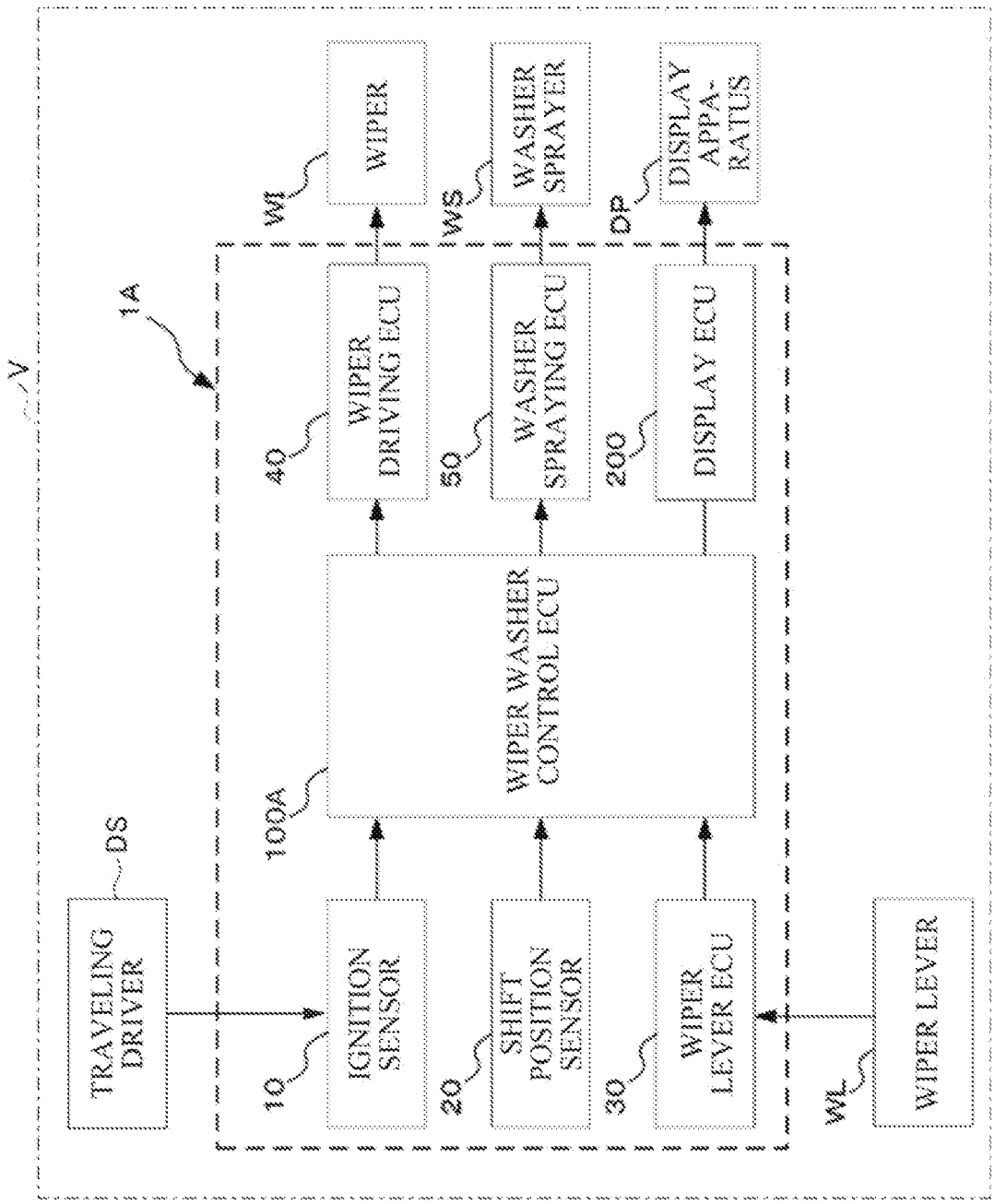
FIG. 5 is a diagram illustrating a configuration of a wiper washer control apparatus according to one example embodiment of the disclosure.
Figure 6:
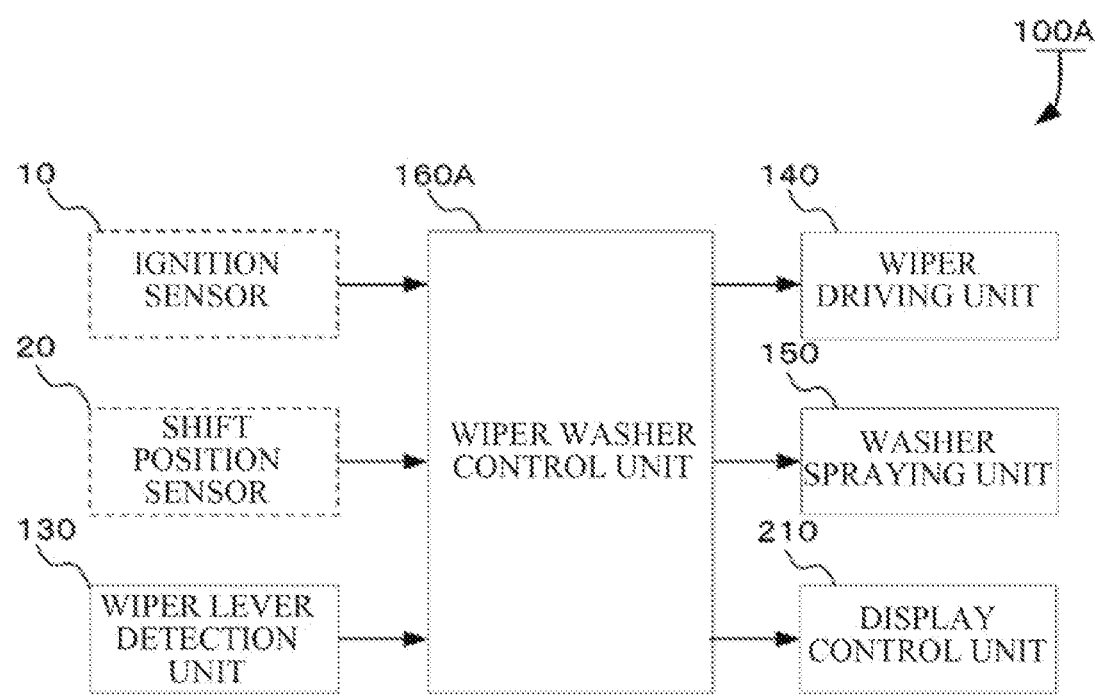
FIG. 6 is a diagram illustrating a configuration of a wiper washer control ECU of the wiper washer control apparatus according to one example embodiment of the disclosure.
Figure 7:
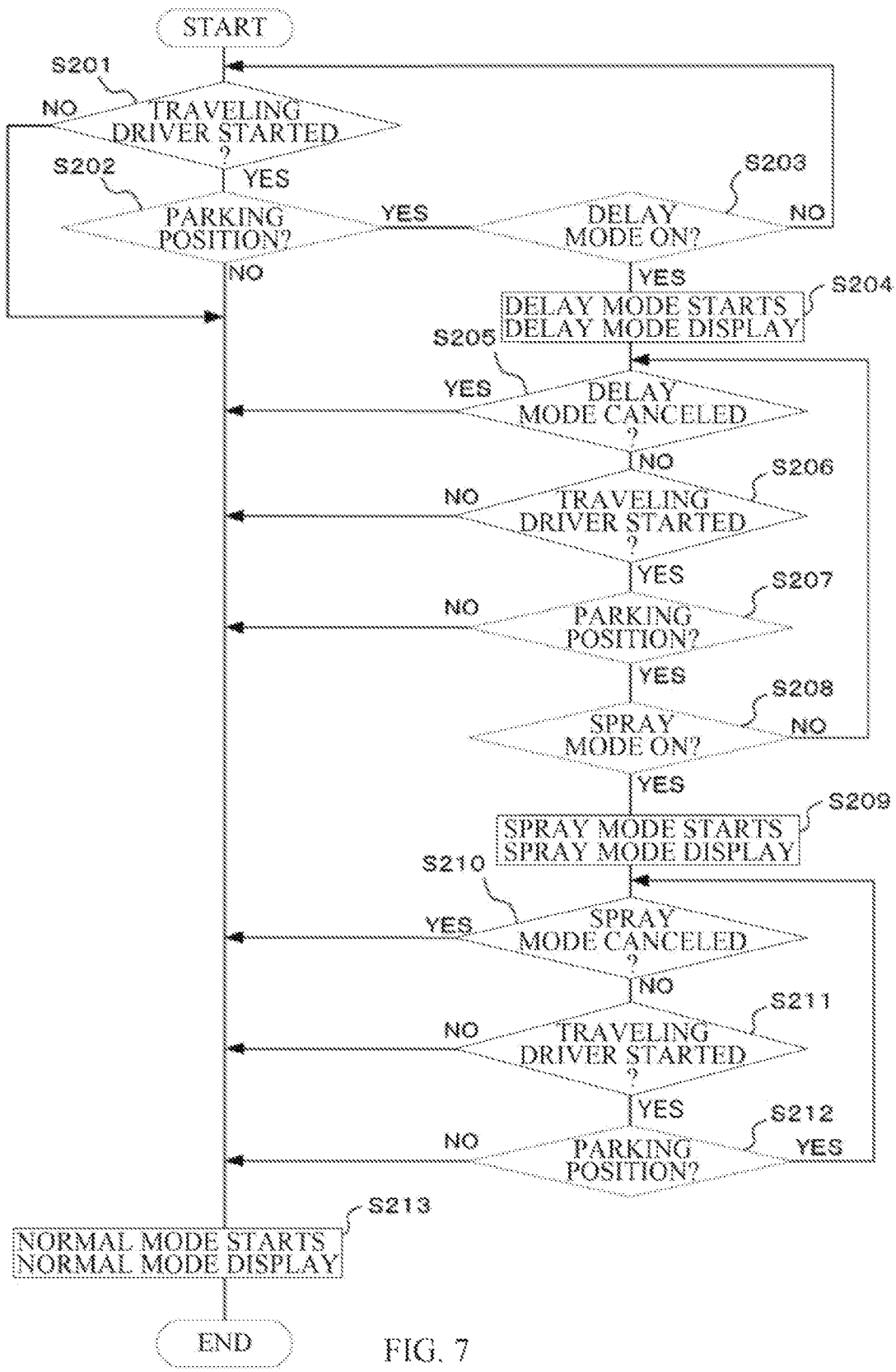
FIG. 7 is a flowchart of a process to be executed by the wiper washer control ECU of the wiper washer control apparatus according to one example embodiment of the disclosure.

A description is provided of a wiper washer control apparatus 1A according to another example embodiment with reference to FIGS. 5 to 7.

[Configuration of Wiper Washer Control Apparatus 1A]

As illustrated in FIG. 5, the wiper washer control apparatus 1A according to the example embodiment may include the ignition sensor 10, the shift position sensor 20, the wiper lever ECU 30, the wiper driving ECU 40, the washer spraying ECU 50, a display ECU 200, and a wiper washer control ECU 100A.

Coupled to the wiper washer control ECU 100A may be the ignition sensor 10, the shift position sensor 20, the wiper lever ECU 30, the wiper driving ECU 40, the washer spraying ECU 50, and the display ECU 200.

The display ECU 200 may cause a control state of the wiper driving ECU 40 and the washer spraying ECU 50 to be displayed. For example, the display ECU 200 may cause a display apparatus DP to display information indicating any of the normal mode NM, the delay mode DM, and the spray mode MM as the operation mode, based on the operation mode as the control to be performed by the wiper driving ECU 40 and the washer spraying ECU 50.

Based on the operation information related to the wiper lever WL and transmitted from the wiper lever ECU 30, the wiper washer control ECU 100A may control the wiper driving ECU 40 and the washer spraying ECU 50, and cause, via the display ECU 200, the display apparatus DP to display the operation mode.

Details will be described below.

[Configuration of Wiper Washer Control ECU 100A]

As illustrated in FIG. 6, the wiper washer control ECU 100A may include the wiper lever detection unit 130, the wiper driving unit 140, the washer spraying unit 150, a display control unit 210, and a wiper washer control unit 160A.

For example, the wiper lever ECU 30, the wiper driving ECU 40, the washer spraying ECU 50, and the display ECU 200 may each perform transmission and reception of information with the wiper washer control unit 160A via a control area network (CAN).

The display control unit 210 may cause, via the display ECU 200, the display apparatus DP to display the control state of the wiper driving unit 140 and the washer spraying unit 150. The display control unit 210 may receive control information from the wiper washer control unit 160A; may transmit, to the display ECU 200, information to display the normal mode NM, the delay mode DM, or the spray mode MM based on the operation mode as the control to be performed by the wiper driving unit 140 and the washer spraying unit 150; and cause the display apparatus DP to display the operation mode.

The wiper washer control unit 160A may determine whether the traveling driver DS is in the started state based on information from the ignition sensor 10. The wiper washer control unit 160A may also determine whether the shift position is the parking position based on information from the shift position sensor 20. The wiper washer control unit 160A may also determine the operation of the wiper lever WL based on the operation information related to the wiper lever WL from the wiper lever detection unit 130.

Through such determination based on the information from the ignition sensor 10, the information from the shift position sensor 20, and the operation information related to the wiper lever WL from the wiper lever detection unit 130, the wiper washer control unit 160A may control each of the wiper driving unit 140, the washer spraying unit 150, and the display control unit 210.

For example, the wiper washer control unit 160A may change the control to be performed by the wiper driving unit 140 based on the information from the ignition sensor 10 regarding whether the traveling driver DS is in the started state, the information from the shift position sensor 20 regarding whether the shift position is the parking position, and the operation information related to the wiper lever WL from the wiper lever detection unit 130. In addition, the wiper washer control unit 160A may cause, via the display control unit 210, the display apparatus DP to display the operation mode based on the operation mode.

When the wiper washer control unit 160A receives, from the ignition sensor 10, information indicating that the traveling driver DS is in the started state; receives, from the shift position sensor 20, information indicating that the shift position is in the parking range; and receives, from the wiper lever detection unit 130, information indicating that the delay mode DM is to be started, the wiper washer control unit 160A may change the control to be performed by the wiper driving unit 140 to the delay mode DM and cause, via the display control unit 210, the display apparatus DP to display information indicating the delay mode DM. The delay mode DM may be a mode in which a time from a start of the washer spraying to a start of the wiper operation is delayed as compared with that in the normal mode NM.

When the wiper washer control unit 160A receives, from the wiper lever detection unit 130, information indicating that the spray mode MM is to be started, while changing the control to be performed by the wiper driving unit 140 to the delay mode DM, the wiper washer control unit 160A may change the control to be performed by the wiper driving unit 140 to the spray mode MM and cause, via the display control unit 210, the display apparatus DP to display information indicating the spray mode MM.

When the wiper washer control unit 160A receives the engine stop information from the ignition sensor 10 while changing the control to be performed by the wiper driving unit 140 to the delay mode DM, or when the wiper washer control unit 160A receives, from the shift position sensor 20, information indicating that the shift position is in a range other than the parking range, while changing the control to be performed by the wiper driving unit 140 to the delay mode DM, the wiper washer control unit 160A may change the control to be performed by the wiper driving unit 140 to the normal mode NM and cause, via the display control unit 210, the display apparatus DP to display information indicating the normal mode NM.

When the wiper washer control unit 160A receives, from the wiper lever detection unit 130, information indicating that the spray mode MM is to be canceled, while changing the control to be performed by the wiper driving unit 140 to the delay mode DM, the wiper washer control unit 160A may change the control to be performed by the wiper driving unit 140 to the normal mode NM and cause, via the display control unit 210, the display apparatus DP to display the information indicating the normal mode NM.

[Process to be Performed by Wiper Washer Control Apparatus 1A]

Referring to FIG. 7, a process to be performed by the wiper washer control apparatus 1A according to the example embodiment will be described.

The wiper washer control unit 160A may determine whether the traveling driver DS is in the started state, based on the information from the ignition sensor 10 (step S201).

If the wiper washer control unit 160A determines that the traveling driver DS is not in the started state (step S201: NO), the wiper washer control unit 160A may change the operation mode to the normal mode NM and cause the display control unit 210 to allow for display of information indicating the normal mode NM (step S213).

If the wiper washer control unit 160A determines that the traveling driver DS is in the started state (step S201: YES), the wiper washer control unit 160A may determine whether the shift position is the parking position, based on the information from the shift position sensor 20 (step S202).

If the wiper washer control unit 160A determines that the shift position is not the parking position (step S202: NO), the wiper washer control unit 160A may change the operation mode to the normal mode NM and cause the display control unit 210 to allow for the display of the information indicating the normal mode NM (step S213).

If the wiper washer control unit 160A determines that the shift position is the parking position (step S202: YES), the wiper washer control unit 160A may determine whether the operation information related to the wiper lever WL is "delay mode ON", based on the information from the wiper lever detection unit 130 (step S203).

If the wiper washer control unit 160A determines that the operation information related to the wiper lever WL is not "delay mode ON" (step S203: NO), the wiper washer control unit 160A may return the process to step S201.

If the wiper washer control unit 160A determines that the operation information related to the wiper lever WL is "delay mode ON" (step S203: YES), the wiper washer control unit 160A may change the operation mode to the delay mode DM and cause the display control unit 210 to allow for display of information indicating the delay mode DM (step S204).

When the delay mode DM is started, the wiper washer control unit 160A may determine whether the delay mode DM has been canceled, based on the information from the wiper lever detection unit 130 (step S205).

If the wiper washer control unit 160A determines that the operation information related to the wiper lever WL indicates that the delay mode DM has been canceled (step S205: YES), the wiper washer control unit 160A may change the operation mode to the normal mode NM and cause the display control unit 210 to allow for the display of the information indicating the normal mode NM (step S213).

If the wiper washer control unit 160A determines that the operation information related to the wiper lever WL indicates that the delay mode DM has not been canceled yet (step S205: NO), the wiper washer control unit 160A may determine whether the traveling driver DS is in the started state, based on the information from the ignition sensor 10 (step S206).

If the wiper washer control unit 160A determines that the traveling driver DS is not in the started state (step S206: NO), the wiper washer control unit 160A may change the operation mode to the normal mode NM and cause the display control unit 210 to allow for the display of the information indicating the normal mode NM (step S213).

If the wiper washer control unit 160A determines that the traveling driver DS is in the started state (step S206: YES), the wiper washer control unit 160A may determine whether the shift position is the parking position, based on the information from the shift position sensor 20 (step S207).

If the wiper washer control unit 160A determines that the shift position is not the parking position (step S207: NO), the wiper washer control unit 160A may change the operation mode to the normal mode NM and cause the display control unit 210 to allow for the display of the information indicating the normal mode NM (step S213).

If the wiper washer control unit 160A determines that the shift position is the parking position (step S207: YES), the wiper washer control unit 160A may determine whether the operation information related to the wiper lever WL is "spray mode ON", based on the information from the wiper lever detection unit 130 (step S208).

If the wiper washer control unit 160A determines that the operation information related to the wiper lever WL is not "spray mode ON" (step S208: NO), the wiper washer control unit 160A may return the process to step S205.

If the wiper washer control unit 160A determines that the operation information related to the wiper lever WL is "spray mode ON" (step S208: YES), the wiper washer control unit 160A may change the operation mode to the spray mode MM and cause the display control unit 210 to allow for display of information indicating the spray mode MM (step S209).

When the spray mode MM is started, the wiper washer control unit 160A may determine whether the spray mode MM has been canceled, based on the information from the wiper lever detection unit 130 (step S210).

If the wiper washer control unit 160A determines that the operation information related to the wiper lever WL is "spray mode MM is to be canceled" (step S210: YES), the wiper washer control unit 160A may change the operation mode to the normal mode NM and cause the display control unit 210 to allow for the display of the information indicating the normal mode NM (step S213).

If the wiper washer control unit 160A determines that the operation information related to the wiper lever WL is "spray mode MM is not to be canceled" (step S210: NO), the wiper washer control unit 160A may determine whether the traveling driver DS is in the started state, based on the information from the ignition sensor 10 (step S211).

If the wiper washer control unit 160A determines that "the traveling driver DS is in the stopped state" (step S211: NO), the wiper washer control unit 160 may change the operation mode to the normal mode NM and cause the display control unit 210 to allow for the display of the information indicating the normal mode NM (step S213).

If the wiper washer control unit 160A determines that "the traveling driver DS is in the started state" (step S211: YES), the wiper washer control unit 160A may determine whether the shift position is the parking position, based on the information from the shift position sensor 20 (step S212).

If the wiper washer control unit 160A determines that "the shift position is not the parking position" (step S212: NO), the wiper washer control unit 160A may change the operation mode to the normal mode NM and cause the display control unit 210 to allow for the display of the information indicating the normal mode NM (step S213).

If the wiper washer control unit 160A determines that "the shift position is the parking position" (step S212: YES), the wiper washer control unit 160A may cause the process to return to step S210.

[Action and Effects]

As described above, the wiper washer control apparatus 1A according to the example embodiment may further include the display control unit 210 that presents the state of the control of the wiper driving unit 140 and the washer spraying unit 150 by the wiper washer control unit 160A.

That is, it is possible for the driver to easily check whether the operation mode of the wiper driving unit 140 is the normal mode NM, the delay mode DM, or the spray mode MM on the display apparatus DP that is caused to perform display via the display control unit 210.

Accordingly, it is possible to make the operation to be performed by the driver easier, and to defrost the front windshield in a short time.

Note that the example embodiments are described above, referring to the example where the shift position information is received from the gear sensor; however, the shift position information may be acquired from an ECU mounted in the vehicle V.

The example embodiments are described above, referring to the example where the times t1 and t2 up to the start of the operation of the wiper WI are each a time elapsed from switching of the state of the washer sprayer WS from the non-operating state to the operating state; however, the times t1 and t2 up to the start of the operation of the wiper WI may each be a time elapsed from switching of the state of the washer sprayer WS from the operating state to the non-operating state.

The example embodiments are described above, referring to the example where the wiper washer control unit 160 changes the operation mode to the delay mode DM in response to the wiper lever WL being used to select the delay mode DM; however, for example, the wiper washer control unit 160 may change the operation mode to the delay mode DM when the wiper washer control unit 160 receives information indicating that a temperature is a set temperature or lower and determines that the temperature is the set temperature or lower based on information from a temperature sensor provided in the vehicle V.

In some embodiments, it is possible to implement the wiper washer control apparatus 1 or 1A of the example embodiment of the disclosure by recording the process to be executed by the wiper washer control unit 160 or 160A on a non-transitory recording medium readable by a computer system, and causing the computer system to load the program recorded on the non-transitory recording medium onto the wiper washer control unit 160 or 160A to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be what is called a differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the wiper washer control ECU 100 illustrated in FIG. 1, the wiper lever detection unit 130, the wiper driving unit 140, the washer spraying unit 150, and the wiper washer control unit 160 illustrated in FIG. 2, the wiper washer control ECU 100A illustrated in FIG. 5, the wiper lever detection unit 130, the wiper driving unit 140, the washer spraying unit 150, the wiper washer control unit 160A, and the display control unit 210 illustrated in FIG. 6 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the wiper washer control ECU 100 illustrated in FIG. 1, the wiper lever detection unit 130, the wiper driving unit 140, the washer spraying unit 150, and the wiper washer control unit 160 illustrated in FIG. 2, the wiper washer control ECU 100A illustrated in FIG. 5, the wiper lever detection unit 130, the wiper driving unit 140, the washer spraying unit 150, the wiper washer control unit 160A, and the display control unit 210 illustrated in FIG. 6. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the wiper washer control ECU 100 illustrated in FIG. 1, the wiper lever detection unit 130, the wiper driving unit 140, the washer spraying unit 150, and the wiper washer control unit 160 illustrated in FIG. 2, the wiper washer control ECU 100A illustrated in FIG. 5, the wiper lever detection unit 130, the wiper driving unit 140, the washer spraying unit 150, the wiper washer control unit 160A, and the display control unit 210 illustrated in FIG. 6.

The invention claimed is:

1. A wiper washer control apparatus comprising:
an ignition sensor configured to receive information regarding whether a traveling driver is in a started state or a stopped state;
a shift position sensor configured to receive information regarding a position selected by a gear shift lever;
a wiper driving unit configured to cause a wiper to operate, the wiper being configured to wipe a front windshield;
a washer spraying unit configured to cause a washing liquid to be sprayed to the front windshield;
a wiper lever detection unit configured to receive operation information related to a wiper lever, the wiper lever being configured to allow for an operation of the wiper and an operation of washer spraying; and
a wiper washer control unit configured to:
control the wiper driving unit and the washer spraying unit based on the operation information related to the wiper lever and received by the wiper lever detection unit;
execute a normal mode, in which the washer spraying unit is caused to operate and, after a first time elapses, the wiper driving unit is caused to operate;
change a control to be performed by the wiper driving unit to a delay mode when the wiper washer control unit receives information indicating that the traveling driver is in the started state from the ignition sensor, receives information indicating that a shift position is in a parking range from the shift position sensor, and receives information indicating that the delay mode is to be started from the wiper lever detection unit, the delay mode being a mode in which the washer spraying unit is caused to operate and, after a second time elapses, the wiper driving unit is caused to operate, the second time being longer than the first time; and
change the control to be performed by the wiper driving unit to a spray mode when the wiper washer control unit is in the delay mode and receives information indicating that the spray mode is to be started from the wiper lever detection unit, the spray mode being a mode in which the washer spraying unit is caused to operate without causing the wiper driving unit to operate,
wherein the wiper washer control unit is configured to change the control to be performed by the wiper driving unit to the normal mode when the wiper washer control unit receives information indicating that the normal mode to be started from the wiper lever detecting unit,
wherein the information indicating that the normal mode to be started includes first information indicating that the wiper lever is in a first position, wherein the information indicating that the delay mode is to be started includes second information indicating that the wiper lever is in a second position, the second position being different from the first position, wherein the information indicating that the spray mode is to be started includes third information indicating that the wiper lever has moved twice in a predetermined pattern, the predetermined pattern including the wiper lever moving from the second position to the third position, followed by moving back from the third position to the second position, the third position being different from the first position and the second position, wherein the wiper washer control unit is further configured to, after changing the control to be performed by the wiper driving unit to the delay mode, upon receiving fourth information from the wiper lever detection unit indicating that the wiper lever is in the third position, initiates operation of only the washer spray unit without operating the wiper drive unit.

2. The wiper washer control apparatus according to claim 1, wherein the wiper washer control unit is configured to change the control to be performed by the wiper driving unit to the normal mode when the wiper washer control unit receives, in the delay mode, stop information related to the traveling driver from the ignition sensor or when the wiper washer control unit receives, in the delay mode, information indicating that the shift position is in a range other than the parking range from the shift position sensor.

3. The wiper washer control apparatus according to claim 2, wherein the wiper washer control unit is configured to change the control to be performed by the wiper driving unit to the normal mode when the wiper washer control unit receives, in the spray mode, cancel information related to the spray mode from the wiper lever detection unit.

4. The wiper washer control apparatus according to claim 1, wherein the wiper washer control unit is configured to change the control to be performed by the wiper driving unit to the normal mode when the wiper washer control unit receives, in the spray mode, cancel information related to the spray mode from the wiper lever detection unit.

5. The wiper washer control apparatus according to claim 1, further comprising a display control unit configured to:
when the wiper washer control unit is in the delay mode, cause a display device to display that the control to be performed by the wiper driving unit is in the delay mode; and when the wiper washer control unit is in the spray mode, cause the display device to display that the control to be performed by the wiper driving unit is in the spray mode.

6. The wiper washer control apparatus according to claim 1, wherein the wiper washer control unit is configured to change the control to be performed by the wiper driving unit to the normal mode when the wiper washer control unit receives, in the spray mode, cancel information related to the spray mode from the wiper lever detection unit, and
wherein the cancel information related to the spray mode includes the third information.

7. The wiper washer control apparatus according to claim 6, wherein the wiper washer control unit is configured to change the control to be performed by the wiper driving unit to the normal mode when the wiper washer control unit receives, in the delay mode, stop information related to the traveling driver from the ignition sensor or when the wiper washer control unit receives, in the delay mode, information indicating that the shift position is in a range other than the parking range from the shift position sensor.

8. The wiper washer control apparatus according to claim 7, further comprising a display control unit configured to:
when the wiper washer control unit is in the delay mode, cause a display device to display that the control to be performed by the wiper driving unit is in the delay mode; and
when the wiper washer control unit is in the spray mode, cause the display device to display that the control to be performed by the wiper driving unit is in the spray mode.

9. A wiper washer control apparatus comprising:
an ignition sensor configured to receive information regarding whether a traveling driver is in a started state or a stopped state;
a shift position sensor configured to receive information regarding a position selected by a gear shift lever; and
circuitry configured to:
receive operation information related to a wiper lever, the wiper lever being configured to allow for an operation of a wiper and an operation of washer spraying;
control wiper driving and washer spraying based on the operation information related to the wiper lever, the wiper driving causing the wiper to operate, the wiper being configured to wipe a front windshield, the washer spraying causing a washing liquid to be sprayed to the front windshield;
execute a normal mode, in which the washer spraying is caused to operate and, after a first time elapses, the wiper driving is caused to operate
change a control to be performed by the wiper driving to a delay mode when receiving information indicating that the traveling driver is in the started state from the ignition sensor, receiving information indicating that a shift position is in a parking range from the shift position sensor, and receiving information indicating that the delay mode is to be started, the delay mode being a mode in which the washer spraying is caused to operate and, after a second time elapses, the wiper driving is caused to operate, the second time being longer than the first time; and
change the control to be performed by the wiper driving to a spray mode when the circuitry is in the delay mode and receives information indicating that the spray mode is to be started, the spray mode being a mode in which the washer spraying is caused to operate without causing the wiper driving to operate,
wherein the circuitry is configured to change the control to be performed by the wiper driving to the normal mode when the circuitry receives information indicating that the normal mode to be started,
wherein the information indicating that the normal mode to be started includes first information indicating that the wiper lever is in a first position,
wherein the information indicating that the delay mode is to be started includes second information indicating that the wiper lever is in a second position, the second position being different from the first position,
wherein the information indicating that the spray mode is to be started includes third information indicating that the wiper lever has moved twice in a predetermined pattern, the predetermined pattern including the wiper lever moving from the second position to a third position, followed by moving back from the third position to the second position, the third position being different from the first position and the second position, wherein the circuitry is further configured to, after changing the control to be performed by the wiper driving to the delay mode, upon receiving fourth information indicating that the wiper lever is in the third position, initiates operation of only the washer spraying without operating the wiper driving.

10. The wiper washer control apparatus according to claim 9, wherein the circuitry is configured to change the control to be performed by the wiper driving to the normal mode when the circuitry receives, in the spray mode, cancel information related to the spray mode, and wherein the cancel information related to the spray mode includes the third information.

11. The wiper washer control apparatus according to claim 10, wherein the circuitry is configured to change the control to be performed by the wiper driving to the normal mode when the circuitry receives, in the delay mode, stop information related to the traveling driver from the ignition sensor or when the circuitry receives, in the delay mode, information indicating that the shift position is in a range other than the parking range from the shift position sensor.

12. The wiper washer control apparatus according to claim 11, wherein the circuitry is configured to:

when the circuitry is in the delay mode, cause a display device to display that the control to be performed by the wiper driving is in the delay mode; and when the circuitry is in the spray mode, cause the display device to display that the control to be performed by the wiper driving is in the spray mode.

* * * * *